(12) United States Patent
Song et al.

(10) Patent No.: US 9,853,897 B2
(45) Date of Patent: Dec. 26, 2017

(54) FORWARD PACKET WITH EDGE DEVICE

(71) Applicant: HEWLETT PACKARD ENTERPRISE DEVELOPMENT LP, Houston, TX (US)

(72) Inventors: Xiaoheng Song, Beijing (CN); Guoliang Zheng, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 243 days.

(21) Appl. No.: 14/402,688

(22) PCT Filed: Aug. 29, 2013

(86) PCT No.: PCT/CN2013/082551
§ 371 (c)(1),
(2) Date: Nov. 21, 2014

(87) PCT Pub. No.: WO2014/032598
PCT Pub. Date: Mar. 6, 2014

(65) Prior Publication Data
US 2015/0110111 A1  Apr. 23, 2015

(30) Foreign Application Priority Data

Aug. 30, 2012  (CN) .......................... 2012 1 0315857

(51) Int. Cl.
*H04L 12/28* (2006.01)
*H04L 12/741* (2013.01)
(Continued)

(52) U.S. Cl.
CPC ........ *H04L 45/745* (2013.01); *H04L 12/4641* (2013.01); *H04L 12/6418* (2013.01);
(Continued)

(58) Field of Classification Search
None
See application file for complete search history.

(56) References Cited

U.S. PATENT DOCUMENTS

2006/0047851 A1    3/2006  Voit et al.
2008/0219268 A1*   9/2008  Dennison ............ H04L 12/4625
                                                         370/395.2
(Continued)

FOREIGN PATENT DOCUMENTS

CN    1431786    7/2003
CN    101778035  7/2010
(Continued)

OTHER PUBLICATIONS

International Search Report and Written Opinion dated Dec. 5, 2013 issued on PCT Patent Application No. PCT/CN2013/082551 dated Aug. 29, 2013, The State Intellectual Property Office. P.R. China.

*Primary Examiner* — Jutai Kao
(74) *Attorney, Agent, or Firm* — Hewlett Packard Enterprise Patent Department

(57) ABSTRACT

When a User Edge Device (UED) receives a unicast packet from a user side, the UED searches in a Media Access Control (MAC) table. When a matching entry in the MAC table is found, the UED forwards the unicast packet locally. When no matching entry in the MAC table is found, the UED transmits the unicast packet to a Network Edge Device (NED). When the UED receives a broadcast packet from the user side, the UED broadcasts the broadcast packet within a same Virtual Local Area Network (VLAN) of a local site and forwards to the NED.

18 Claims, 5 Drawing Sheets

(51) Int. Cl.
  *H04L 12/64*   (2006.01)
  *H04L 12/46*   (2006.01)
  *H04L 12/749*   (2013.01)
  *H04L 12/721*   (2013.01)
  *H04L 12/715*   (2013.01)

(52) U.S. Cl.
  CPC .............. *H04L 45/54* (2013.01); *H04L 45/66*
      (2013.01); *H04L 45/04* (2013.01); *H04L 45/68*
      (2013.01); *H04L 45/741* (2013.01)

(56) References Cited

U.S. PATENT DOCUMENTS

| | | | |
|---|---|---|---|
| 2009/0037607 A1* | 2/2009 | Farinacci ............ | H04L 12/4641 |
| | | | 709/249 |
| 2011/0286462 A1* | 11/2011 | Kompella ................ | H04L 45/18 |
| | | | 370/395.53 |
| 2012/0131216 A1 | 5/2012 | Jain et al. | |
| 2013/0100851 A1* | 4/2013 | Bacthu ................ | H04L 12/4641 |
| | | | 370/254 |

FOREIGN PATENT DOCUMENTS

| | | |
|---|---|---|
| CN | 101924699 | 12/2010 |
| CN | 102413061 | 4/2012 |
| CN | 102571610 | 7/2012 |
| CN | 102739498 | 10/2012 |

* cited by examiner

FORWARD PACKET WITH EDGE DEVICE

CROSS-REFERENCE TO RELATED APPLICATION

The present application is a 371 application of International Application No. PCT/CN2013/082551 filed on Aug. 29, 2013 and entitled "Forward Packet with Edge Device," which claims benefit of Chinese Patent App. No. CN 201210315857.3 filed on Aug. 30, 2012.

BACKGROUND

An Ethernet Virtualization Interconnection (EVI) network may connect multiple network sites deployed in different locations. The EVI network is a system that may implement a Layer 2 interconnection among the network sites with virtual links. The EVI network may implement Layer 2 Virtual Private Network (L2VPN) based on an Internet Protocol (IP) Core Network (CN). As used herein, an EVI network may include not only an Ethernet Virtual Interconnection network, but also other appropriate types of network for connecting geographically disperse data centers.

BRIEF DESCRIPTIONS OF THE DRAWINGS

Features of the present disclosure are illustrated by way of example and not limited in the following figures, in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In the present disclosure, a method for forwarding a packet with an Edge Device (ED) and a corresponding ED are provided. EDs may be divided into two categories: User ED (UED) and Network ED (NED). A user of UED may access a hierarchical EVI network through UED and NED. A UED may store Media Access Control (MAC) addresses of a local site. A NED may store all MAC addresses within an EVI instance. Subsequently, since a UED is to store MAC addresses of a local site, requirements for UED specifications may be reduced to facilitate promotion of the EVI networks.

Figure 1:
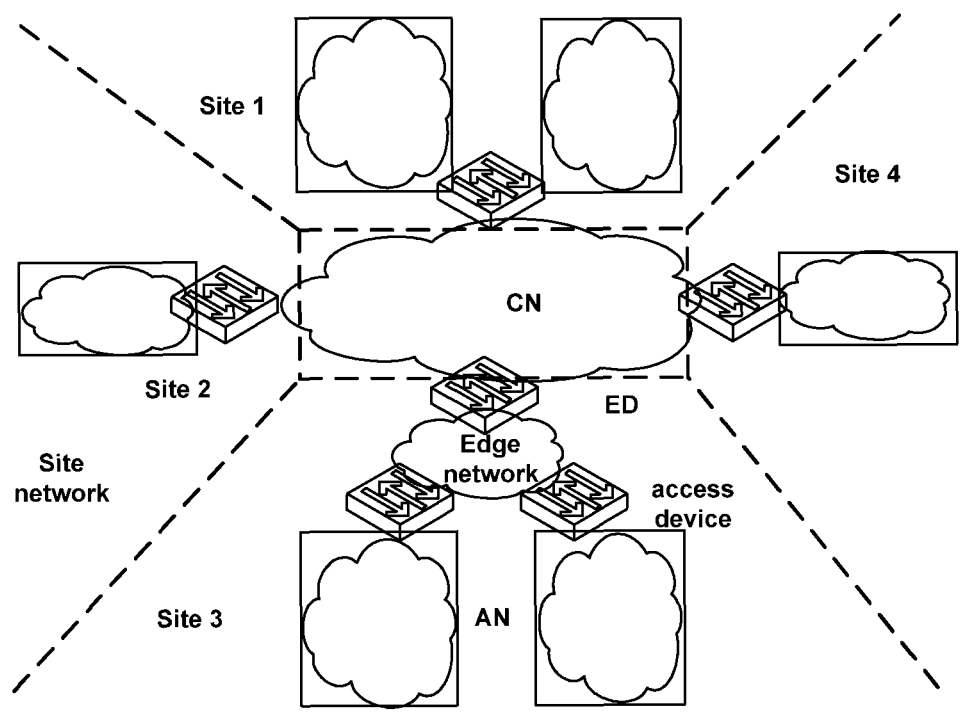
FIG. 1 is a schematic diagram illustrating structure of a fully connected EVI network.

FIG. 1 shows that a fully connected EVI network is formed by a Core Network (CN), an overlapped network, and several network sites, and so on.

A network site is a Layer 2 network (such as a data center) that provides an independent service and it is connected by one or more EDs to the CN. The network site, which is mainly maintained by a user, is in charge of forwarding internal traffic of the user. An ED of the network site may perform Layer 2 switching among different sites.

The CN is a public network that uses IP routing equipment to provide interconnections among the network sites. The CN implements IP forwarding of tunnel packets.

An overlapped network is a virtual network (not shown in the figure) established among the EDs of the sites, which extends a Virtual Local Area Network (VLAN) among different sites to provide the Layer 2 interconnection among the sites. On the data plane, the overlapped network may bear the Layer 2 traffic of VLAN extended among the sites. On the control plane, the overlapped network may communicate MAC addresses of hosts and routers among the sites using the Intermediate System-Intermediate System (IS-IS) protocol.

However, when implementing the Layer 2 interconnection of multiple sites utilizing a fully connected EVI network, a MAC address of a host in each site may be flooded to all of the EDs in the fully connected EVI network. Subsequently, each ED device may maintain a large amount of MAC entries.

Figure 2:
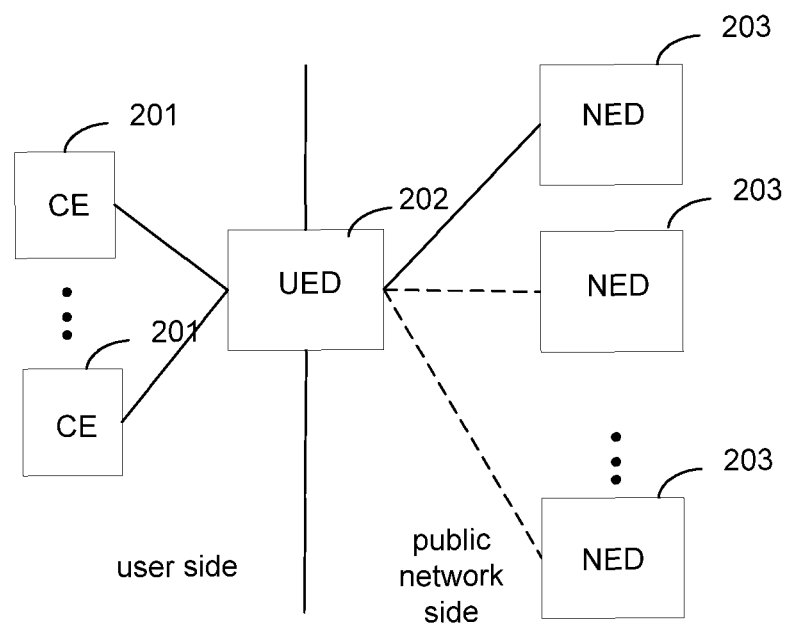
FIG. 2 is a schematic diagram illustrating structure of a hierarchical EVI network, in accordance with a first example of the present disclosure.

FIG. 2 is a schematic diagram illustrating structure of a hierarchical EVI network in accordance with a first example of the present disclosure. In FIG. 2, a UED is an edge device at the user side in the hierarchical EVI network. A NED is an edge device at the provider side in the hierarchical EVI network.

In FIG. 2, a first site may include several Customer Edges (CEs) 201. Each CE 201 connects with a host (not shown in the figure). Each CE 201 may respectively access UED 202 of the hierarchical EVI network. UED 202 may establish one or more EVI connections with one or more NEDs 203 in the hierarchical EVI network.

The example may be applied to a hierarchical EVI network, which may implement Layer 2 interconnections of multiple sites. Hosts within one EVI instance of the hierarchical EVI network may be distributed to different sites. UED 202's MAC table for an EVI instance may store MAC addresses of hosts learned from a site that accesses the EVI instance through UED 202. However, NED 203's MAC table for an EVI instance may store MAC addresses of hosts learned from each site of the EVI instance.

Processes of UED 202 and NED 203 will be described in detail in the following with two parts.

Figure 3:
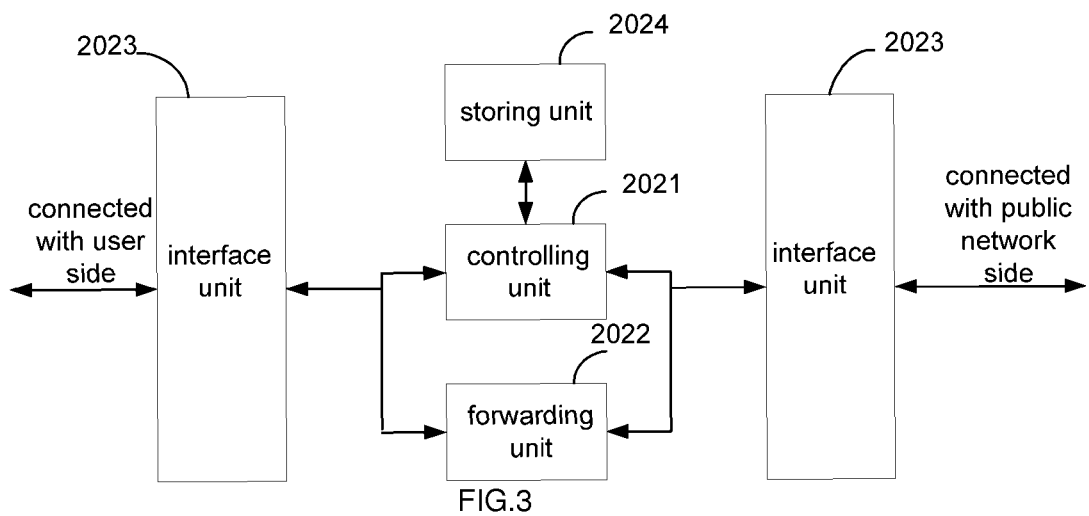
FIG. 3 is a schematic diagram illustrating structure of a User Edge Device (UED), in accordance with the first example of the present disclosure.

The first part is as follows. FIG. 3 is a schematic diagram illustrating the structure of UED 202 in accordance with an example of the present disclosure. As shown in FIG. 3, UED 202 includes a controlling unit 2021, a forwarding unit 2022, one or more interface units 2023, and a storing unit 2024. FIG. 3 shows an interface unit on the user side and an interface unit on the public network side; there may be two separate units or the same unit.

In practical applications, the controlling unit 2021 may be implemented with a hardware chip, such as a Central Processing Unit (CPU). The forwarding unit 2022 is in charge of forwarding packets. The interface unit 2023 refers to an external port of an ED, which may be a physical port or a logical port. The storing unit 2024 is to store information of EVI instances and tunnels.

UED 202 may forward a user packet to the public network side as follows. When the interface unit 2023 receives a unicast packet from the user side, the forwarding unit 2022 may search in a MAC table of an EVI instance for a matching entry. When there is a hit in the MAC table, the forwarding unit 2022 may forward the unicast packet within a local site of the EVI instance via the interface unit 2023 based on the searching result. When there is a miss in the MAC table, the forwarding unit 2022 may forward the unicast packet to the one or more NEDs of the EVI instance via the interface unit 2023. The forwarding unit 2022 may also receive a broadcast packet from the user side via the interface unit 2023, broadcast the broadcast packet received from the user side within the same VLAN at the local site via the interface unit 2023, and forward the broadcast packet to the one or more NEDs via the interface unit 2023.

UED 202 forwards a public network packet to the user side as follows. When the interface unit 2023 receives a unicast packet from a NED on the public network side, the forwarding unit 2022 may search in the MAC table for a matching entry. When there is a hit in the MAC table, the forwarding unit 2022 may forward the public network packet within the local site via the interface unit 2023 based on the searching result. When there is a miss in the MAC table, the forwarding unit 2022 may broadcast the public network packet within the same VLAN of the local site via the interface unit 2023. The forwarding unit 2022 may also receive a broadcast packet from the NED on the public network side via the interface unit 2023, and broadcast the broadcast packet received from the NED within the same VLAN of the local site via the interface unit 2023.

Different from an ED of the fully connected EVI network, UED 202 in the example may learn local MAC addresses instead of a remote MAC address. UED 202 may advertise the learned local MAC addresses to the one or more NEDs 203 with the IS-IS protocol. In practical applications, UED 202 may generally learn a local MAC address based on a source MAC address in an Ethernet header of a Layer 2 packet received from the user side. The foregoing Layer 2 packet may be a unicast packet or a broadcast packet. That is, when receiving a Layer 2 unicast or broadcast packet from the user side via the interface unit 2023, the forwarding unit 2022 may determine an EVI instance based on a port receiving the Layer 2 unicast or broadcast packet, and a VLAN ID of the received Layer 2 unicast or broadcast packet. Subsequently, the forwarding unit 2022 may record a corresponding relationship among the VLAN ID, the source MAC address, and the port to learn the local MAC address. When advertising the learned local MAC address, the controlling unit 2021 may transmit an IS-IS protocol packet carrying the learned local MAC address to the one or more NEDs 203 via the interface unit 2023.

Figure 4:
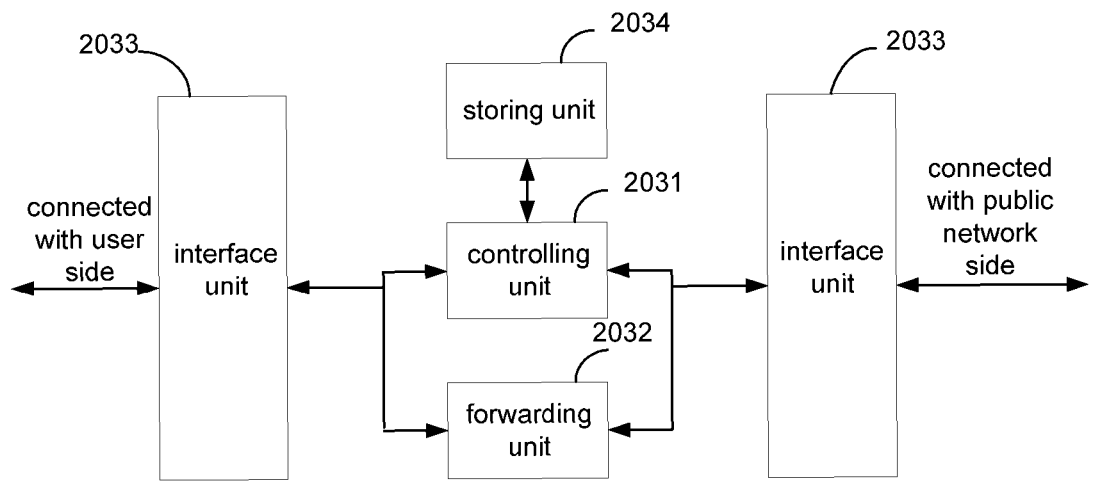
FIG. 4 is a schematic diagram illustrating structure of a Network ED (NED), in accordance with the first example of the present disclosure.

The second part is as follows. FIG. 4 is a schematic diagram illustrating structure of NED 203 in accordance with an example of the present disclosure. NED 203 may include a controlling unit 2031, a forwarding unit 2032, one or more interface units 2033, and a storing unit 2034. The forwarding unit 2032 may record local MAC addresses and remote MAC addresses learned within an EVI instance.

NED 203 forwards a public network packet to a user side as follows. When the interface unit 2033 receives a unicast packet from a UED on the public network side, the forwarding unit 2032 may search for a matching entry in a MAC table based on the unicast packet received from the UED. When there is a hit in the MAC table, the forwarding unit 2032 may forward the unicast packet received from the UED within the EVI instance via the interface unit 2033 based on the searching result. When there is a miss in the MAC table, the forwarding unit 2032 may forward the unicast packet received from the UED back to the UED via the interface unit 2033. The forwarding unit 2032 may receive a broadcast packet from the UED via the interface unit 2033, broadcast the broadcast packet received from the UED within the same VLAN of the local site via the interface unit 2033, and forward the broadcast packet to other EDs in the EVI instance, except for the UED, via the interface unit 2033.

NED 203 forwards a user packet to the public network side as follows. When the interface unit 2033 receives a unicast packet from the user side, the forwarding unit 2032 may search for a matching entry in the MAC table based on the unicast packet. When there is a hit in the MAC table, the forwarding unit 2032 may forward the unicast packet received from the user side within the EVI instance via the interface unit 2033 based on the searching result. When there is a miss in the MAC table, the forwarding unit 2032 may forward the unicast packet received from the user side within the same VLAN of the local site via the interface unit 2033. When the interface unit 2033 receives a broadcast packet from the user side, the forwarding unit 2032 may broadcast the received broadcast packet within the same VLAN of the local site via the interface unit 2033, and forward the received broadcast packet to UED 202 and the other EDs via the interface unit 2033.

NED 203 receives a public network packet from another ED on the public network side as follows. When the interface unit 2033 receives a unicast packet of another ED on the public network side, the forwarding unit 2032 may search for a matching entry in the MAC table. When there is a hit on an entry about the local site in the MAC table, the forwarding unit 2032 may forward the unicast packet within the local site. When there is a hit on an entry about UED 202 in the MAC table, the forwarding unit 2032 may forward the unicast packet to UED 202. When there is a hit on an entry about still another ED on the public network side, the forwarding unit 2032 may discard the unicast packet. When there is a miss in the MAC table, the forwarding unit 2032 may broadcast the unicast packet within the same VLAN of the local site. When the interface unit 2033 receives a broadcast packet of another ED on the public network side, the forwarding unit 2032 may broadcast the broadcast packet from the another ED on the public network side within the same VLAN of the local site via the interface unit 2033.

In the example, NED 203 may learn local MAC addresses and remote MAC addresses of another site. A fully connected structure may be employed between NED 203 and another ED (other NED or ED) of the public network side. NED 203 may also flood the learned local MAC addresses and the remote MAC addresses advertised by UED 202 to other ED or other NED. However, NED 203 may not advertise the learned local MAC addresses or remote MAC addresses to UED 202.

In practical applications, the forwarding unit 2032 may learn a local MAC address based on a source MAC address in an Ethernet header of a Layer 2 user packet. That is, the forwarding unit 2032 may receive a Layer 2 unicast or broadcast packet from the user side via the interface unit 2033, determine an EVI instance based on a port receiving the Layer 2 unicast or broadcast packet, and a VLAN ID of the Layer 2 unicast or broadcast packet. Subsequently, the forwarding unit 2032 may record a corresponding relationship among the VLAN ID, the source MAC address, and the port in the MAC table of the EVI instance to learn the local MAC address. The forwarding unit 2032 may also learn remote MAC addresses based on IS-IS protocol packets. That is, the forwarding unit 2032 may receive an IS-IS protocol packet from the public network side via the interface unit 2033, determine the EVI instance based on an identifier of the EVI instance associated with the IS-IS protocol packet, and record in the MAC table of the EVI instance a corresponding relationship among the VLAN ID and the MAC address in the IS-IS protocol packet, as well as a public network interface receiving the IS-IS protocol packet to learn a remote MAC address. Meanwhile, when advertising MAC addresses, the controlling unit 2031 may transmit an IS-IS protocol packet to another ED via the interface unit 2033. The transmitted IS-IS protocol packet may carry the learned local MAC addresses and the remote MAC addresses, which are learned from the IS-IS protocol packet coming from UED 202.

In practical applications, the controlling unit of UED and NED may be implemented based on the CPU. The forwarding unit of the UED and NED may be implemented based on a forwarding chip. The storing unit of the UED and NED may be implemented based on a memory. To better describe the technical solution of the present disclosure, a second example is described in the following.

Figure 5:
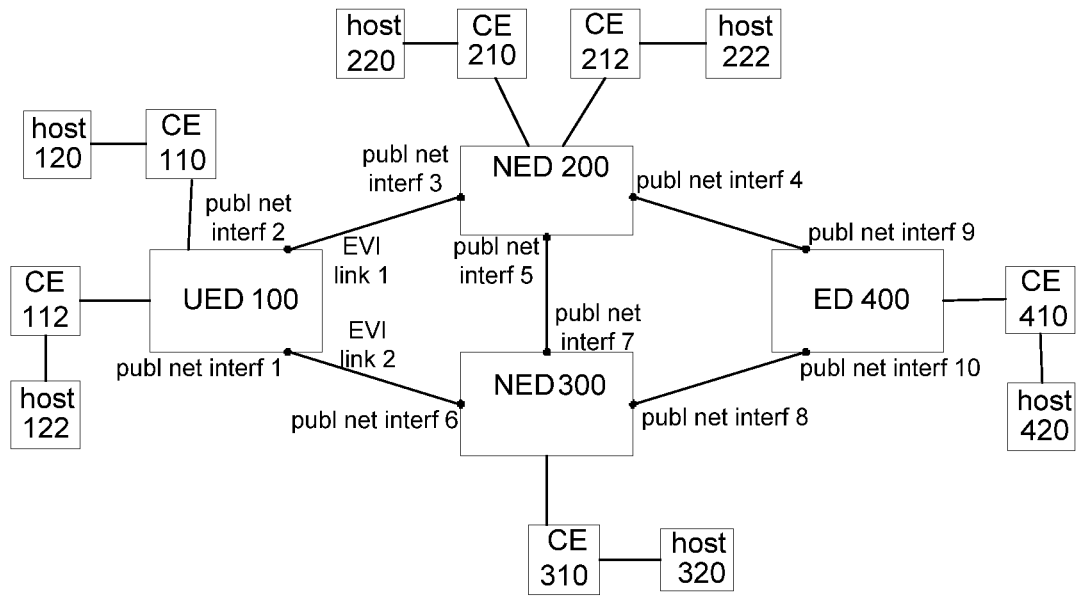
FIG. 5 is a schematic diagram illustrating structure of a hierarchical EVI network, in accordance with a second example of the present disclosure.

FIG. 5 is a schematic diagram illustrating structure of a hierarchical EVI network in accordance with a second example of the present disclosure. In FIG. 5, UED 100 is a user ED in the hierarchical EVI network. NED 200 and NED 300 are Provider EDs in the hierarchical EVI network. ED 400 is a common ED in the EVI network, which is to connect a user network and an IP backbone network. ED 400 is the same as the ED in the fully connected EVI network in FIG. 1. The fully connected structure may also be employed among NED 200, NED 300, and ED 400.

As shown in FIG. 5, CE 110 and CE 112 of a first site may access UED 100 of the EVI hierarchical network. CE 210 and CE 212 of a second site may access NED 200 of the EVI hierarchical network. CE 310 of a third site may access NED 300. CE 410 of a fourth site may access ED 400. The MAC address of host 120 connected with CE 110 is hereafter "MAC 120." The MAC address of host 122 connected with CE 112 is hereafter "MAC 122."

The MAC address of host 220 connected with CE 210 is hereafter "MAC 220." The MAC address of host 222 connected with CE 212 is hereafter "MAC 222." The MAC address of host 320 connected with CE 310 is hereafter "MAC 320." The MAC address of host 420 connected with CE 410 is hereafter "MAC 420."

In the example, an EVI connection may be established between UED 100 and NED 200. Another EVI connection may also be established between UED 100 and NED 300. It can be seen that an EVI connection may be established in the hierarchical EVI network between a UED and one or more NEDs. In other examples EVI connections may be established in the hierarchical EVI network between multiple UEDs and one or more NEDs.

Here, the EVI connection established between UED 100 and NED 200 is EVI LINK1. The EVI connection established between UED 100 and NED 300 is EVI LINK2. A public network interface 2 of UED 100 may correspond to EVI LINK1. A public network interface 1 of UED 100 may correspond to EVI LINK2. When UED 100 needs to advertise local MAC addresses or forward packets to NED 200 and NED 300, UED 100 may transmit IS-IS protocol packets and user packets to NED 200 via EVI LINK1, which corresponds to public network interface 2. In other examples UED 100 may also transmit the IS-IS protocol packets and the user packets to NED 300 via EVI LINK2, which corresponds to public network interface 1.

As shown in FIG. 5, in an EVI instance, the EVI connections established between NED 200 and UED 100, NED 300, ED 400 respectively correspond to public network interface 3, public network interface 5 and public network interface 4; the EVI connections established between NED 300 and UED 100, NED 200, ED 400 respectively correspond to public network interfaces 6, 7 and 8; the EVI connections established between ED 400 and NED 200, NED 300 respectively correspond to public network interfaces 9 and 10.

The CPU of UED 100, NED 200 and NED 300 may process protocol packets of the control plane, obtain information about each EVI instance, store the information about each EVI instance into the storing unit, set hardware forwarding entries for each EVI instance according to the information about each EVI instance, and record the set hardware forwarding entries in the forwarding chip. The hardware forwarding table of each EVI instance may include a tunnel encapsulation table, a tunnel termination table, a broadcast table, a tunnel selection HASH table, a MAC table, and so on.

The MAC tables of forwarding chips in UED 100, NED 200, and NED 300 are empty when initializing. UED 100, NED 200, and NED 300 are to learn MAC addresses. A mode for the controlling unit in UED 100, NED 200, and NED 300 to generate and configure these hardware forwarding tables is the same as the mode for the controlling unit in an ED of the fully connected EVI network shown in FIG. 1 to generate and configure a hardware forwarding table. However, a mode to learn MAC addresses for the forwarding chips in UED 100, NED 200, and NED 300 is different from that in an ED of the fully connected EVI network shown in FIG. 1. A method for UED 100 to learn MAC addresses may refer to descriptions about UED 202 in the first example. A method for NED 200 and NED 300 to learn MAC addresses may refer to descriptions about NED 203.

UED 100 may learn local MAC addresses and advertise to NED 200 and NED 300. NED 200 may learn local MAC addresses and remote MAC addresses about other sites advertised by UED 100, NED 300, and ED 400. NED 300 may learn local MAC addresses and remote MAC addresses about other sites advertised by UED 100, NED 200, and ED 400. NED 200 and NED 300 may also advertise their respective local MAC addresses and remote MAC addresses advertised by UED 100 to ED 400. ED 400 may learn local MAC addresses and MAC addresses advertised by remote NED 200 and NED 300, and advertise learned MAC addresses within the local site to NED 200 and NED 300.

In practical applications, when UED 100 has respectively established an equal cost EVI connection with NED 200 and NED 300 that are in the same EVI instance, to further reduce the load on UED 100 and the public network side, as well as to avoid advertising redundant MAC addresses, UED 100 may select public network interface 1 or 2 based on the broadcast table of the EVI instance and transmit an IS-IS protocol packet carrying the learned local MAC addresses to NED 300 or NED 200 via an EVI connection corresponding to the selected public network interface. In other examples UED 100 may evenly divide the learned local MAC addresses into two groups, select public network interfaces 1 and 2 from the broadcast table of the EVI instance, and respectively transmit an IS-IS protocol packet carrying local MAC addresses of each group to NED 300 or NED 200 via EVI LINK2 corresponding to public network interface 1 and EVI LINK 1 corresponding to public network interface 2.

In the example, each of the unicast packet and the broadcast packet may be a protocol packet or a data packet. A host connected with UED 100 may access another host at a local site or a remote site. A host of NED 200 or NED 300 may also access another local host or another remote host. Regardless of packet type and site accessed, a description of the access process involving packet forwarding by UED or NED will be provided with an example below. In the example, regarding NED 200, NED 300 and ED 400 are other EDs. Similarly, regarding NED 300, NED 200 and ED 400 are other EDs.

First Example

In the hierarchical EVI network shown in FIG. 5, before host 120 accessing host 420, assume host 120 initially does not possess Address Resolution Protocol (ARP) information of host 420. Thus host 120 may transmit an ARP request packet. The foregoing ARP request packet is a protocol packet, which is a Layer 2 broadcast packet. In FIG. 5, after receiving the ARP request packet transmitted by host 120, CE 110 may learn the MAC address of host 120 based on the source MAC address in the Ethernet header of the ARP request packet and continuously broadcast the ARP request packet within VLAN 10.

In the example, the forwarding process of the ARP request packet from host 120 to host 420 may be as follows.

In block M1, after receiving the ARP request packet, UED 100 may determine an EVI instance based on VLAN 10 of the ARP request packet and port 1 receiving the ARP request packet, and record in a MAC table of the EVI instance a corresponding relationship among VLAN 10, address of MAC 120, and port 1. Block M1 may be followed by block M2.

In block M2, UED 100 may select other ports (not shown in the figure) of VLAN 10 from a broadcast table of the EVI instance to broadcast the ARP request packet locally, and select public network interface 2 from public network interfaces 1 and 2, which are recorded in the broadcast table of the EVI instance, to transmit the ARP request packet to NED 200.

When transmitting the ARP request packet to NED 200, UED 100 may search for the encapsulation information corresponding to public network interface 2 in the tunnel encapsulation table, encapsulate the ARP request packet with an IP Generic Routing Encapsulation (GRE) header based on an IP header and a GRE header recorded in the encapsulation information. UED 100 may also encapsulate the ARP request packet with an outer Ethernet header based on the destination MAC address and the VLAN ID of the outer Ethernet header recorded in the encapsulation information. UED 100 may configure its local MAC address as the source MAC address of the outer Ethernet header, and transmit the Ethernet packet from an egress port of specified in the encapsulation information. Since the ARP packet may be encapsulated as an Ethernet over IP GRE packet, a device between UED 100 and NED 200 forwards the ARP request packet to NED 200 based on the IP GRE tunnel header (the IP header and the GRE header between the Ethernet header and the outer Ethernet header of the ARP request packet) of the Ethernet IP GRE packet to transmit the ARP request packet to NED 200 through EVI LINK 1 carried by an IP GRE tunnel (EVI tunnel) between UED 100 and NED 200.

UED 100 may calculate a hash value with an existing hash algorithm, and select a public network interface from the public network interfaces recorded in the broadcast table of the EVI instance based on the hash value. For example, UED 100 may perform a hash calculation based on the VLAN ID and the destination MAC address of the ARP request packet (Layer 2 broadcast packet), and determine a public network interface corresponding to the hash value from the tunnel selection table. Block M2 may be followed by block M3.

In block M3, UED 100 may select public network interface 2 from public network interfaces 1 and 2 recorded in the broadcast table of the EVI instance, and transmit an IS-IS protocol packet carrying MAC 120 to NED 200.

When transmitting the IS-IS protocol packet carrying MAC 120 to NED 200, UED 100 may search for the encapsulation information of public network interface 2 based on the tunnel encapsulation table, encapsulate an IP GRE tunnel header for the IS-IS protocol packet based on the IP header and the GRE header recorded in the encapsulation information. UED 100 may also encapsulate an outer Ethernet header for the IS-IS protocol packet based on the destination MAC address and VLAN ID of the outer Ethernet header recorded in the encapsulation information.

Figure 6:
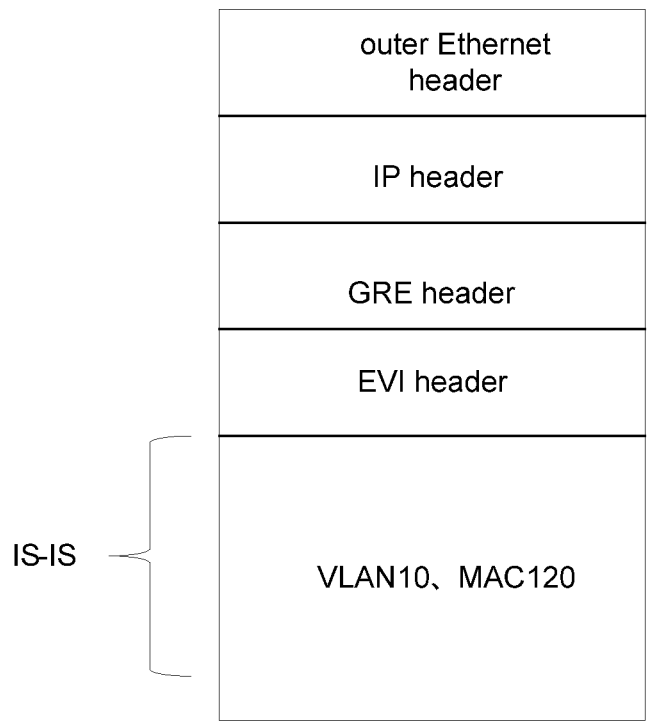
FIG. 6 is a schematic diagram illustrating format of an encapsulated Intermediate System to Intermediate System (IS-IS) packet, in accordance with the second example of the present disclosure.

Since the IS-IS packet is a routing protocol packet, UED 100 may insert an EVI header between the IP GRE tunnel header and the IS-IS protocol packet to identify an EVI instance. FIG. 6 is a schematic diagram illustrating the format of an encapsulated IS-IS packet in accordance with an example of the present disclosure. Since an IP GRE tunnel header and an outer Ethernet header are encapsulated into the IS-IS protocol packet, a device between UED 100 and NED 200 may forward the IS-IS protocol packet to NED 200 based on the IP GRE header. That is, a device transmits the IS-IS protocol packet carrying the learned MAC 120 to NED 200 via EVI LINK1 carried by the IP GRE tunnel (EVI tunnel) between UED 100 and NED 200 to advertise the learned local MAC address to NED 200. Block M3 may be followed by block M4.

In block M4, after receiving the encapsulated ARP request packet from UED 100, NED 200 may decapsulate the received ARP request packet, determine an EVI instance based on the VLAN of the ARP request packet, select a port (not shown in the figure) of VLAN 10 from a broadcast table of the determined EVI instance, broadcast and forward the ARP request packet within the same VLAN of the local site, select two public network interfaces 4 and 5 from public network interfaces 3, 4 and 5 recorded in the broadcast table of the EVI instance (that is, two public network interfaces except for public network interface 3 that received the ARP request packet), and transmit the ARP request packet to ED 400 and NED 300.

When NED 200 decapsulates the ARP request packet and determines the destination MAC address of the outer Ethernet header is the MAC address of NED 200, NED 200 may remove the outer Ethernet header and perform tunnel matching based on the tunnel termination table, the destination IP address, and the source IP address of the IP GRE tunnel header, as well as the GRE header type. NED 200 may then remove the IP GRE tunnel header and proceed with the ARP forwarding process.

When transmitting the ARP request packet to NED 300 and ED 400, NED 200 may search for the encapsulation information for public network interfaces 5 and 4 based on the tunnel encapsulation table, encapsulate the ARP request packet into the Ethernet over IP GRE packet, and respectively transmit via egress ports (not shown in the figure) specified in the encapsulation information of the two public network interfaces. Block M4 may be followed by block M5.

In block M5, after receiving the IS-IS protocol packet from UED 100, NED 200 may decapsulate the received IS-IS protocol packet, determine an EVI instance based on the EVI header, and record a corresponding relationship among VLAN 10, MAC 120, and public network interface 3 (determined based on the IP GRE tunnel header of the encapsulated IS-IS protocol packet) in the MAC table of the EVI instance. NED 200 may select public network interfaces 4 and 5 from the broadcast table of the EVI instance, and transmit the IS-IS protocol packet carrying the learned remote MAC 120 to ED 400 and NED 300.

When transmitting the IS-IS protocol packet carrying MAC 120 to NED 300 and ED 400, NED 200 may search for the encapsulation information corresponding to public network interfaces 5 and 4 in the tunnel encapsulation table, encapsulate the IS-IS protocol packet with an IP GRE tunnel header based on the IP header and the GRE header recorded in the encapsulation information. NED 200 may also encapsulate the IS-IS protocol packet with an outer Ethernet header based on the destination MAC address and the VLAN ID of the outer Ethernet header recorded in the encapsulation information, and respectively transmit the encapsulated IS-IS protocol packet via an egress port (not shown in the figure) specified in the encapsulation information about each of the two public network interfaces.

NED 200 may insert an EVI header between the IP GRE tunnel header and the IS-IS protocol packet to identify an EVI instance. Format of the encapsulated IS-IS packet transmitted by NED 200 is the same as format of the encapsulated IS-IS protocol packet shown in FIG. 6. Block M5 may be followed by block M6.

In block M6, ED 400 and NED 300 receive the ARP request packet from NED 200, decapsulate the received ARP request packet, determine an EVI instance based on the VLAN of the ARP request packet, select a port (not shown in the figure) of VLAN 10 from the broadcast table of the determined EVI instance, and forward locally. Block M6 may be followed by block M7.

In block M7, after receiving the IS-IS protocol packet advertised by NED 200, ED 400 may decapsulate the received IS-IS protocol packet, determine an EVI instance based on the EVI header, and record a corresponding relationship among VLAN 10, MAC 120 and public network interface 9 in the MAC table of the EVI instance. After receiving the IS-IS protocol packet advertised by NED 200, NED 300 may decapsulate the received IS-IS protocol packet, determine an EVI instance based on the EVI header, and record a corresponding relationship among VLAN 10, MAC 120 and public network interface 7 in the MAC table of the EVI interface.

After receiving the ARP request packet, CE 410 may learn the MAC address of host 120, and continuously broadcast the ARP request packet within VLAN 10. After receiving the ARP request packet, host 420 may record the ARP information in the ARP table of host 420. Subsequently, host 420 may generate an ARP response packet and transmit to CE 410. The destination MAC address and source MAC address of the Ethernet header in the ARP response packet are respectively MAC 120 and MAC 420. After receiving the ARP response packet, CE 410 may learn MAC 420 and transmit the ARP response packet to ED 400.

The foregoing processes describe the packet forwarding process and the MAC address learning process performed by each ED based on a hypothetical exchange. In practical applications, execution order may not strictly comply with the order in foregoing flow. The execution order in foregoing flow may not limit the technical solution of the present disclosure.

Descriptions about forwarding the ARP response packet from host 420 to host 120 will be provided in the following. Here, the ARP response packet may be a protocol packet and also a unicast packet. The forwarding process about the ARP response packet may be as follows.

In block M8, after receiving the ARP response packet, ED 400 may determine an EVI instance based on VLAN 10 of the ARP response packet and port 5 (not shown in the figure) receiving the ARP response packet, and record a corresponding relationship among VLAN 10, MAC 420, and port 5 in the MAC table of the EVI instance. When searching out a MAC entry matching to VLAN 10 and MAC 120 in the MAC table of the EVI instance, ED 400 may transmit the ARP response packet to NED 200 via public network interface 9 as specified in the matching entry.

When transmitting the ARP response packet to NED 200, ED 400 may search for the encapsulation information of public network interface 9 in the tunnel encapsulation table, encapsulate the ARP response packet with an IP GRE tunnel header and an outer Ethernet header based on the IP header, the GRE header, and the destination MAC address and the VLAN ID of the outer Ethernet header recorded by the encapsulation information. ED 400 may configure its MAC address as the destination MAC address of the outer Ethernet header, and transmit via an egress port specified in the encapsulation information for public network interface 9. Block M8 may be followed by block M9.

In block M9, ED 400 may select public network interfaces 9 and 10 from the broadcast table of the EVI instance, and transmit an IS-IS protocol packet carrying learned local MAC 420 to NED 200 and NED 300.

When transmitting the IS-IS protocol packet carrying the learned local MAC 420 to NED 200 and NED 300, ED 400 may search for the encapsulation information corresponding to public network interfaces 9 and 10 in the tunnel encapsulation table, encapsulate the IS-IS protocol packet with an IP GRE tunnel header based on the IP header and the GRE header recorded in the encapsulation information. ED 400 may also encapsulate the IS-IS protocol packet with an outer Ethernet header based on the destination MAC address and VLAN ID of the outer Ethernet header recorded in the encapsulation information, and respectively transmit the encapsulated IS-IS protocol packet via an egress port (not shown in the figure) specified in the encapsulation information of the two public network interfaces.

Format of the encapsulated IS-IS packet, which is transmitted by ED 400, is the same as the format shown in FIG. 6. Block M9 may be followed by block M10.

In block M10, after receiving the encapsulated ARP response packet from ED 400, NED 200 may decapsulate the encapsulated ARP response packet received, determine an EVI instance based on a VLAN of the ARP response packet, search for an entry matching to VLAN 10 and MAC 120 in the MAC table of the determined EVI instance, and transmit the ARP response packet to UED 100 to public network interface 3 as specified in the matching entry.

NED 200 may search for the encapsulation information corresponding to public network interface 3 in the tunnel encapsulation table, encapsulate the ARP response packet with an IP GRE tunnel header based on the IP header and the GRE header recorded in the encapsulation information. NED 200 may also encapsulate the ARP response packet with an outer Ethernet header based on the destination MAC address and the VLAN ID of the outer Ethernet header recorded in the encapsulation information, configure its MAC address as the source MAC address of the outer Ethernet header, and transmit the encapsulated ARP response packet via an egress port (not shown in the figure) specified in the encapsulation information. Block M10 may be followed by block M11.

In block M11, after receiving the IS-IS protocol packet transmitted by ED 400, NED 200 may decapsulate the received IS-IS protocol packet, determine an EVI instance based on an EVI header, and record a corresponding relationship among VLAN 10, MAC 420, and public network interface 4 in the MAC table of the determined EVI instance. After receiving the IS-IS protocol packet from ED 400, NED 300 may decapsulate the received IS-IS protocol packet, determine an EVI instance according to the EVI header, and record a corresponding relationship among VLAN 10, MAC 420, and public network interface 8 in the MAC table of the determined EVI instance. Block M11 may be followed by block M12.

In block M12, after receiving the encapsulated ARP response packet from NED 200, UED 100 may decapsulate the encapsulated ARP response packet, determine an EVI instance based on VLAN 10 of the ARP response packet, search for an entry matching to VLAN 10 and MAC 120 in the MAC table of the determined EVI instance, and forward locally via port 1 as specified in the matching entry, that is, forward to CE 110 via port 1.

After receiving the ARP response packet, CE 110 may transmit the ARP response packet to host 120 based on the learned MAC 120. Subsequently, host 120 may record ARP information based on the received ARP response packet.

Based on the modes of MAC learning and packet forwarding described in the second example, after UED 100 learns MAC addresses, the MAC table may appear as shown in Table 1.

TABLE 1

| VLAN number | MAC address | Interface information | ... |
|---|---|---|---|
| VLAN10 | MAC120 | Port 1 | ... |

After NED 200 learns MAC addresses, the MAC table of NED 200 may appear as shown in Table 2.

TABLE 2

| VLAN number | MAC address | Interface information | ... |
|---|---|---|---|
| VLAN10 | MAC120 | Public network interface 3 | ... |
| VLAN10 | MAC420 | Public network interface 4 | ... |

After NED 300 learns MAC addresses, the MAC table of the EVI instance may appear as shown in Table 3.

TABLE 3

| VLAN number | MAC address | Interface information | ... |
|---|---|---|---|
| VLAN10 | MAC120 | Public network interface 6 | ... |
| VLAN10 | MAC420 | Public network interface 8 | ... |

After ED 400 learns MAC addresses, the MAC table of the EVI instance of ED 400 may appear as shown in Table 4.

TABLE 4

| VLAN number | MAC address | Interface information | ... |
|---|---|---|---|
| VLAN10 | MAC120 | Public network interface 9 | ... |
| VLAN10 | MAC420 | Port 5 | ... |

Based on foregoing examples, it can be seen that since the UED learns local MAC addresses, while the NED learns local MAC addresses within the EVI instance and remote MAC addresses, specification requirements for a UED may be reduced to facilitate promotion of Layer 2 interconnection services.

Second Example

When host 120 is to transmit a Layer 2 unicast Ethernet packet to host 122, host 120 may transmit the Layer 2 unicast Ethernet packet to CE 110 based on the recorded ARP information. The source MAC address and destination MAC address of the Layer 2 unicast Ethernet packet are respectively MAC 120 and MAC 122. The foregoing Layer 2 unicast Ethernet packet is the unicast packet mentioned in the first example, which may be assumed to be a data packet. Packet forwarding process may be described hereafter with the foregoing example.

In block T1, CE 110 may transmit the unicast Ethernet packet of host 120 to UED 100.

When CE 110 does not find an entry corresponding to MAC 122 in the MAC table of VLAN 10, CE 110 may broadcast the unicast Ethernet packet within VLAN 10. Block T1 may be followed by block T2.

In block T2, UED 100 may determine an EVI instance based on VLAN 10 of the unicast Ethernet packet and port 1 receiving the unicast Ethernet packet. When UED 100 does not find an entry matching to VLAN 10 and MAC 122 in the MAC table of the EVI instance, UED 100 may select public network interface 2 from public network interfaces 1 and 2 recorded in the broadcast table of the EVI instance, and transmit the unicast Ethernet packet to NED 200 via the selected public network interface 2.

In the example, hosts 120 and 122 are in the same site. As UED 100 has yet to learn the MAC address of host 122, the lookup in the MAC table returns a miss. Suppose in practical applications that UED 100 has learned the MAC address of host 122, then the unicast Ethernet packet may be forwarded within the local site of the EVI instance based on the searching result. Block T2 may be followed by block T3.

In block T3, after receiving the encapsulated unicast Ethernet packet from UED 100, NED 200 may decapsulate the encapsulated unicast Ethernet packet, determine an EVI instance based on VLAN 10 to which the unicast Ethernet packet belongs. When NED 200 does not find an entry matching to VLAN 10 and MAC 122 in the MAC table of the determined EVI instance, NED 200 selects public network interface 3 receiving the encapsulated unicast Ethernet packet from the broadcast table of the EVI instance, and forward the unicast Ethernet packet back to UED 100 via public network interface 3.

NED 200 may search for the encapsulation information corresponding to public network interface 3 in the tunnel encapsulation table, encapsulate the unicast Ethernet packet with an IP GRE tunnel header based on the IP header and the GRE header recorded in the encapsulation information. NED 200 may also encapsulate the unicast Ethernet packet with an outer Ethernet header based on the destination MAC address and the VLAN ID of the outer Ethernet header recorded in the encapsulation information, configure its MAC address as the source MAC address of the outer Ethernet header, and transmit the encapsulated unicast Ethernet packet via an egress port (not shown in the figure) specified in the encapsulation information. Block T3 may be followed by block T4.

In block T4, after receiving the encapsulated unicast Ethernet packet from NED 200, UED 100 may decapsulate the encapsulated unicast Ethernet packet, determine an EVI instance based on VLAN 10 of the unicast Ethernet packet, select ports of VLAN 10 in the MAC table of the determined EVI instance, and broadcast the unicast Ethernet packet.

When selecting the ports of VLAN 10 and broadcasting the unicast Ethernet packet, UED 100 may search for the source MAC address in the MAC table of the EVI instance. When UED 100 finds a matching entry for port 1, UED 100 forwards the unicast Ethernet packet via other ports except for port 1 of VLAN 10.

When CE 112 receives the unicast Ethernet packet forwarded by UED 100 and does not find an entry matching MAC 122 in the MAC table of VLAN 10 of the EVI instance, CE 112 may broadcast the unicast Ethernet packet within VLAN 10. When CE 112 finds an entry matching MAC 122 in the MAC table of VLAN 10, CE 112 may transmit the unicast Ethernet packet via a port specified in the matching entry.

The packet forwarded in the foregoing process is a unicast packet. When UED 100 finds a matching entry, UED 100 forwards the unicast Ethernet packet locally. When UED 100 does not find a matching entry, the unicast Ethernet packet is forwarded by EDs, that is, UED 100 and NED 200 (block T2).

Third Example

In FIG. 5, under the circumstances that host 220 in VLAN 30 of an EVI instance accesses host 320 of the same VLAN in another site of the EVI instance, when host 220 does not possess ARP information about host 320 in the initial case, host 220 may transmit an ARP request packet. The forwarding process about the ARP request packet from host 220 to host 420 may be as follows.

In block X1, after receiving the ARP request packet transmitted by host 220, CE 210 may learn MAC 220, and broadcast the ARP request packet within VLAN 30. After receiving the ARP request packet from CE 210, NED 200 may determine an EVI instance based on VLAN 30 of the ARP request packet and port 1 receiving the ARP request packet, and record a corresponding relationship among VLAN 30, MAC 220, and port 1 in the MAC table of the EVI instance. Subsequently, NED 200 may select a local port (not shown in the figure) of VLAN 30 in the broadcast table of the determined EVI instance, forward locally, record public network interfaces 3, 4, and 5 in the broadcast table of the EVI instance, and transmit the ARP request packet to UED 100, ED 400, and NED 300. Block X1 may be followed by block X2.

In block X2, NED 200 may select public network interfaces 4 and 5 from the broadcast table of the EVI instance and transmit an IS-IS protocol packet carrying MAC 220 to ED 400 and NED 300. Block X2 may be followed by block X3.

In block X3, after receiving the encapsulated ARP request packet from NED 200, UED 100 may decapsulate the encapsulated ARP request packet, determine an EVI instance based on VLAN 30 of the ARP request packet, select a port (not shown in the figure) of VLAN 30 from the broadcast table of the determined EVI instance, and forward locally. Block X3 may be followed by block X4.

In block X4, after receiving the encapsulated ARP request packet from NED 200, ED 400 may decapsulate the encapsulated ARP request packet, determine an EVI instance based on VLAN 30 of the ARP request packet, select a port (not shown in the figure) of VLAN 30 from the broadcast table of the determined EVI instance, and forward locally. Block X4 may be followed by block X5.

In block X5, after receiving the IS-IS protocol packet advertised by NED 200, ED 400 may decapsulate the received IS-IS protocol packet, determine an EVI instance based on an EVI header, and record a corresponding relationship among VLAN 30, MAC 220, and public network interface 9 in the MAC table of the EVI instance. Block X5 may be followed by block X6.

In block X6, after receiving the encapsulated ARP request packet from NED 200, NED 300 may decapsulate the encapsulated ARP request packet, determine an EVI instance based on VLAN 30 of the ARP request packet, select a port (not shown in the figure) of VLAN 30 from the broadcast table of the determined EVI instance, and forward locally. Block X6 may be followed by block X7.

In block X7, after receiving the encapsulated IS-IS protocol packet from NED 200, NED 300 may decapsulate the encapsulated IS-IS protocol packet, determine an EVI instance based on an EVI header, and record a corresponding relationship among VLAN 30, MAC 220, and public network interface 7 in the MAC table of the EVI instance. Block X7 may be followed by block X8.

In block X8, after receiving the ARP request packet, CE 310 may learn MAC 220 and broadcast the ARP request packet within VLAN 30. After receiving the ARP request packet, host 320 may record ARP information in an ARP table of host 320. Subsequently, host 320 may generate an ARP response packet and transmit to CE 310. The destination MAC address and source MAC address of an Ethernet header in the ARP response packet are respectively MAC 220 and MAC 320. After receiving the ARP response packet, CE 310 may learn MAC 320 and transmit the ARP response packet to NED 300. Block X8 may be followed by block X9.

In block X9, after receiving the ARP response packet, NED 300 may determine an EVI instance based on VLAN 30 of the ARP response packet and port 1 (not shown in the figure) receiving the ARP response packet, and record a corresponding relationship among VLAN 30, MAC 320, and port 1 in the MAC table of the EVI instance. NED 300 may find a matching entry from the MAC table of the EVI instance based on VLAN 30 of the ARP response packet and MAC 220. Subsequently, NED 300 may search for encapsulation information corresponding to public network interface 7 from the matching entry in the tunnel encapsulation table, encapsulate the ARP response packet with an IP GRE tunnel header based on the IP header and the GRE header recorded in the encapsulation information. NED 300 may also encapsulate the ARP response packet with an outer Ethernet header based on the destination MAC address and VLAN ID of the outer Ethernet header recorded in the encapsulation information of public network interface 7, configure its MAC address as the source MAC address of the outer Ethernet header, and transmit via an egress port specified in the encapsulation information of public network interface 7. Block X9 may be followed by block X10.

In block X10, NED 300 may select public network interfaces 7 and 8 from the broadcast table of the EVI instance, and transmit an IS-IS protocol packet carrying MAC 320 to NED 200 and ED 400. Block X10 may be followed by block X11.

In block X11, after receiving the IS-IS protocol packet advertised by NED 300, ED 400 may decapsulate the IS-IS protocol packet, determine an EVI instance based on an EVI header, and record a corresponding relationship among VLAN 30, MAC 320, and public network interface 10 in the MAC table of the EVI instance. Block X11 may be followed by block X12.

In block X12, after receiving the encapsulated ARP response packet from NED 300, NED 200 may decapsulate the encapsulated ARP response packet, determine an EVI instance based on VLAN of the ARP response packet, search for a matching entry of VLAN 30 and MAC 220 in the MAC table of the determined EVI instance, and transmit the ARP response packet to CE 210 via port 1 specified in the matching entry. After receiving the ARP response packet, CE 210 may transmit the ARP response packet to host 220 based on the learned MAC 220. Subsequently, host 220 may record ARP information based on the received ARP response packet. Block X12 may be followed by block X13.

In block X13, after receiving the encapsulated IS-IS protocol packet from NED 300, NED 200 may decapsulate the encapsulated IS-IS protocol packet, determine an EVI instance based on an EVI header, and record a corresponding relationship among VLAN 30, MAC 320, and public network interface 5 in the MAC table of the EVI instance.

In the same EVI instance, the MAC table of an updated EVI instance of NED 200, NED 300, and ED 400 are respectively shown in Tables 5, 6 and 7.

TABLE 5

| VLAN number | MAC address | Interface information | ... |
|---|---|---|---|
| VLAN10 | MAC120 | Public network interface 3 | ... |
| VLAN10 | MAC420 | Public network interface 4 | ... |
| VLAN30 | MAC220 | Port 1 | |
| VLAN30 | MAC320 | Public network interface 5 | |

TABLE 6

| VLAN number | MAC address | Interface information | ... |
|---|---|---|---|
| VLAN10 | MAC120 | Public network interface 6 | ... |
| VLAN10 | MAC420 | Public network interface 8 | ... |
| VLAN30 | MAC220 | Public network interface 7 | |
| VLAN30 | MAC320 | Port 1 | |

TABLE 7

| VLAN number | MAC address | Interface information | ... |
|---|---|---|---|
| VLAN10 | MAC120 | Public network interface 9 | ... |
| VLAN10 | MAC420 | Port 5 | ... |

TABLE 7-continued

| VLAN number | MAC address | Interface information | ... |
|---|---|---|---|
| VLAN30 | MAC220 | Public network interface 9 | |
| VLAN30 | MAC320 | Public network interface 10 | |

UED 100 may learn MAC addresses of a local site of an EVI instance instead of learning a remote MAC address. Thus, in the above process, the MAC table of an EVI instance of UED 100 within the same EVI instance is not updated.

In the above process, both packet forwarding process and MAC addresses learning process are performed by each ED based on a hypothetical exchange. In practical applications, execution order thereof may not strictly comply with the execution order in the above process. The execution order in the above process may not limit the technical solution of the present disclosure.

Fourth Example

As shown in FIG. 5, when host 220 is to transmit a unicast Ethernet packet to host 222, host 220 may transmit the unicast Ethernet packet to CE 210 based on the recorded ARP information. The source MAC address and destination MAC address of the unicast Ethernet packet are respectively MAC 220 and MAC 222. Here, suppose the unicast Ethernet packet is still a data packet, forwarding process thereof may be described with an example.

In block Y1, CE 210 may transmit a unicast Ethernet packet of host 220 to NED 200.

When CE 210 does not find an entry corresponding to MAC 222 from the MAC table of VLAN 30, CE 210 may broadcast the unicast Ethernet packet within VLAN 30. Block Y1 may be followed by block Y2.

In block Y2, after NED 200 receives the unicast Ethernet packet of host 222 destined for the local site, NED 200 may determine an EVI instance based on VLAN 30 of the unicast Ethernet packet and port 1 receiving the unicast Ethernet packet. When NED 200 does not find a matching entry of VLAN 30 and MAC 222 in the MAC table of the EVI instance, NED 200 may forward the unicast Ethernet packet via other ports of VLAN 30, which are recorded in the broadcast table of the EVI instance. That is, NED 200 may broadcast the unicast Ethernet packet within the same VLAN of the local site. In practical applications, when NED finds a matching entry in the MAC table of the EVI instance, NED 200 may forward the unicast Ethernet packet within the EVI instance based on the searching result.

The foregoing four examples respectively describe how each ED forwards packets and learn MAC addresses. Besides, in FIG. 5, after NED 200 and NED 300 receive an encapsulated unicast Ethernet packet from the other side, NED 200 and NED 300 may decapsulate the encapsulated unicast Ethernet packet and determine an EVI instance based on the VLAN of the decapsulated unicast Ethernet packet. When no matching entry of the destination MAC address in an Ethernet header of the decapsulated unicast Ethernet packet is found in the MAC table of the determined EVI instance, NED 200 and NED 300 may forward the decapsulated unicast Ethernet packet within a same VLAN in a local site of the EVI instance.

In FIG. 5, when NED 200 and NED 300 receive the encapsulated unicast Ethernet packet from ED 400, NED 200 and NED 300 may decapsulate the encapsulated unicast Ethernet packet, determine an EVI instance based on the VLAN of the decapsulated unicast Ethernet packet. When no matching entry of the destination MAC address in an Ethernet header of the decapsulated unicast Ethernet packet is found in the MAC table of the determined EVI instance, NED 200 and NED 300 may forward the decapsulated unicast Ethernet packet within a same VLAN in a local site of the EVI instance.

In FIG. 5, a fully connected structure may be employed among NED 200, NED 300, and ED 400. The principle of split horizon may be complied with when forwarding a packet. That is, an Ethernet packet received from a public network may be not transmitted back to the public network. For example, when NED 200 receives an encapsulated unicast Ethernet packet from NED 300, NED 200 may decapsulate the encapsulated unicast Ethernet packet, determine an EVI instance based on the VLAN of the decapsulated unicast Ethernet packet. When a matching entry of the destination MAC address in an Ethernet header of the decapsulated unicast Ethernet packet is found in the MAC table of the determined EVI instance but the matching entry is for ED 400 located in the other side of the public network, NED 200 may discard the unicast Ethernet packet.

In the example illustrated with FIG. 5, UED 100 may not learn remote MAC addresses. Consequently UED 100 may not find a matching MAC entry of a destination MAC address in a unicast packet that is destined for a host in another site of the hierarchical EVI network. UED 100, NED 200, NED 300, and ED 400 may not find a matching entry of MAC address for many reasons. For example, these reasons include aging of a MAC address, loss of an IS-IS protocol packet that is to synchronize with a remote MAC address, and a hash conflict occurs when configuring a learned MAC address in a MAC table of an EVI instance.

In FIG. 5, mechanisms about learning MAC addresses and forwarding packets implemented by ED 400 are the same as that implemented by an ED in FIG. 1, which is not described in detail in the example.

Figure 7:
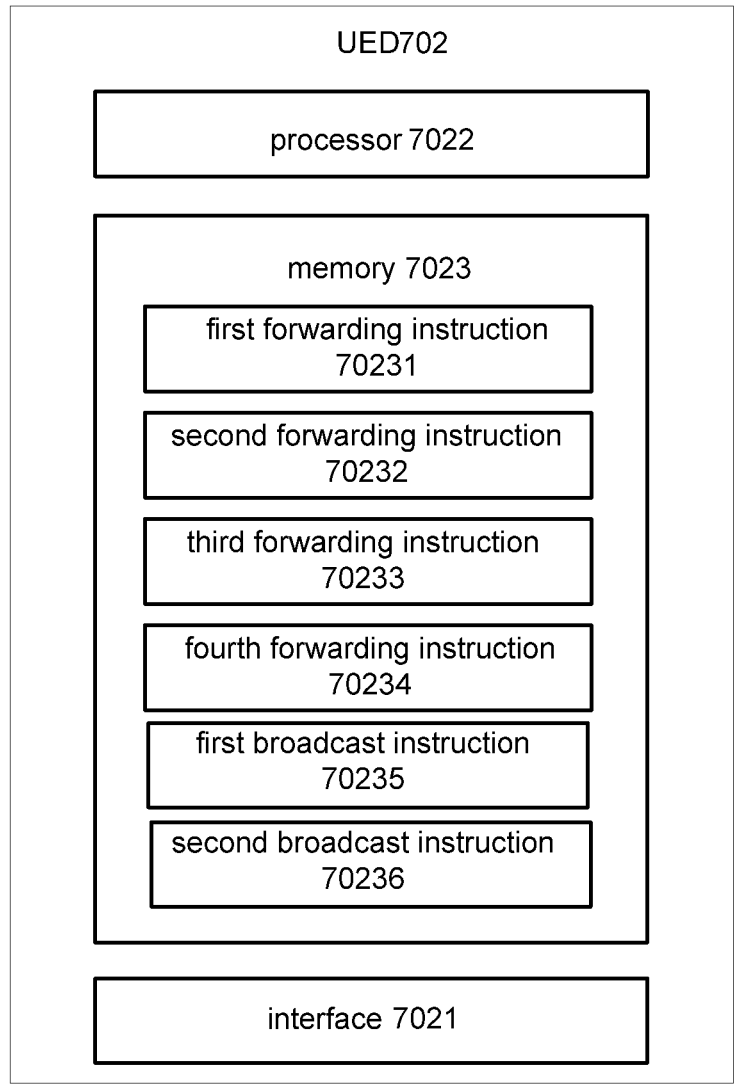
FIG. 7 is a schematic diagram illustrating structure of another UED, in accordance with the first example of the present disclosure.

FIG. 7 is a schematic diagram illustrating another structure of a UED in accordance with an example of the present disclosure. As shown in FIG. 7, UED 702 may at least include an interface 7021, a processor 7022, and a memory 7023.

In practical applications, processor 7022 may be implemented with a hardware chip, such as a CPU, which is mainly in charge of forwarding a packet. The interface 7021 mainly refers to an external interface of UED 702. The memory 7023 is to store information about an EVI instance, a tunnel, as well as a first forwarding instruction 70231, a second forwarding instruction 70232, a third forwarding instruction 70233, a fourth forwarding instruction 70234, a first broadcast instruction 70235 and a second broadcast instruction 70236, which may be executed by the processor 7022.

When UED 702 forwards a user packet to the public network side, the interface 7021 may receive a unicast packet from the user side. The processor 7022 may search for a matching entry in a MAC table of an EVI instance. When a matching entry in the MAC table is found, the processor 7022 may execute the first forwarding instruction 70231 stored in the memory 7023, which is to forward the unicast packet of the user side within a local site of the EVI instance via the interface 7021 based on the searching result. When no matching entry in the MAC table is found, the processor 7022 may execute the second forwarding instruction 70232 stored in the memory 7023, which is to forward the user unicast packet to the NED of the EVI instance via the interface 7021. When processor 7022 receives a broadcast packet from the user side via the interface 7021, processor 7022 may execute the third forwarding instruction 70233 stored in the memory 7023, which is to broadcast the broadcast packet received from the user side within a same VLAN of a local site via the interface 7021 and forward to the NED.

When UED 702 forwards a public network packet to the user side, interface 7021 may receive a unicast packet of NED from the public network side. Processor 7022 may search in a MAC table. When a matching entry in the MAC table is found, processor 7022 may execute the fourth forwarding instruction 70234 stored in the memory 7023, which is to forward the unicast packet within a local site via interface 7021 based on the searching result. When no matching entry in the MAC table is found, processor 7022 may execute the first broadcast instruction 70235 stored in the memory 7023, which is to broadcast the unicast packet within a same VLAN of the local site via interface 7021. When processor 7022 receive a broadcast packet of NED from the public network side via interface 7021, processor 7022 may execute the second broadcast instruction 70236 stored in the memory 7023, which is to broadcast the broadcast packet of NED within the same VLAN of the local site via the interface 7021.

Different from an ED of a fully connected EVI network, UED 702 in the example may learn local MAC addresses instead of learning remote MAC addresses. UED 702 may advertise the learned local MAC address to NED 703 with an IS-IS protocol. In practical applications, UED 702 may generally learn a local MAC address, according to a source MAC address in an Ethernet header of the received user Layer 2 packet. The foregoing Layer 2 packet may be a unicast packet or a broadcast packet. That is, processor 7022 may receive a Layer 2 unicast or broadcast packet from the user side via interface 7021. Processor 7022 may determine an EVI instance based on the port and VLAN ID of the received Layer 2 unicast or broadcast packet. Subsequently, processor 7022 may record a corresponding relationship among the VLAN ID, source MAC address, and the port in the MAC table of the EVI instance to learn the local MAC address. When advertising the MAC address, the processor 7022 may transmit an IS-IS protocol packet carrying the learned local MAC address to NED 703 via interface 7021.

Figure 8:
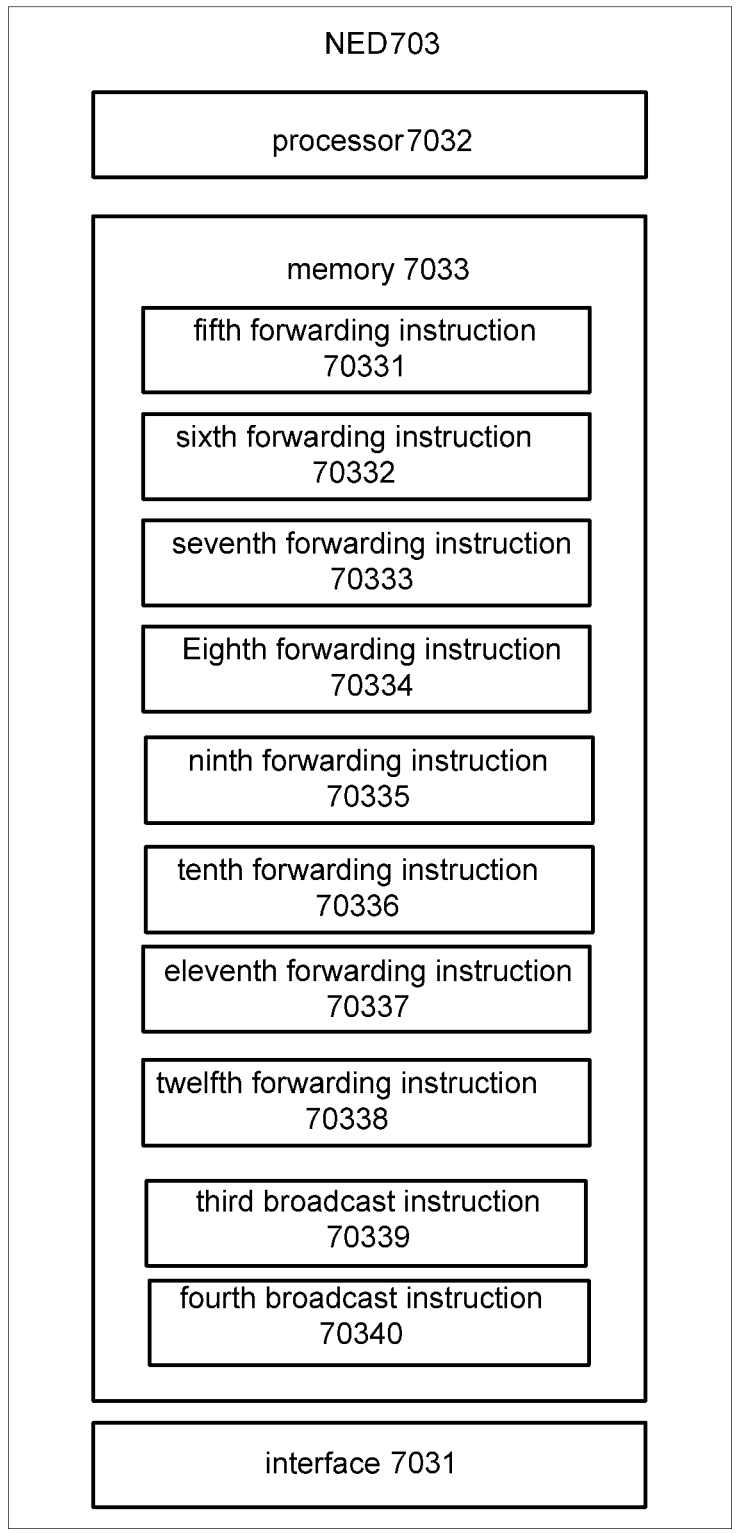
FIG. 8 is a schematic diagram illustrating structure of another NED, in accordance with the first example of the present disclosure.

FIG. 8 is a schematic diagram illustrating another structure of NED 703 in accordance with an example of the present disclosure. As shown in FIG. 8, NED 703 may include an interface 7031, a processor 7032, and a memory 7033.

Processor 7032 is to record local MAC addresses and remote MAC addresses, which are learned within an EVI instance. Memory 7033 may store a fifth forwarding instruction 70331, a sixth forwarding instruction 70332, a seventh forwarding instruction 70333, an eighth forwarding instruction 70334, a ninth forwarding instruction 70335, a tenth forwarding instruction 70336, an eleventh forwarding instruction 70337, a twelfth forwarding instruction 70338, a third broadcast instruction 70339, and a fourth forwarding instruction 70340, which may be executed by processor 7032.

When NED 703 forwards the public network packet to the user side, interface 7031 may receive a unicast packet of UED from the public network side. Processor 7032 may search in the MAC table based on the unicast packet of the UED. When a matching entry in the MAC table is found, processor 7032 may execute the fifth forwarding instruction 70331 stored in the memory 7033, which is to forward the unicast packet within an EVI instance via interface 7031 based on the searching result. When no matching entry in the MAC table is found, processor 7032 may execute the sixth forwarding instruction 70332 stored in the memory 7033, which is to forward the unicast packet coming from the UED back to the UED via interface 7031. When processor 7032 receives a broadcast packet of the UED via interface 7031, processor 7032 may execute the seventh forwarding instruction 70333 stored in the memory 7033, which is to broadcast the broadcast packet of the UED within a same VLAN of the local site via interface 7031 and forward to other EDs except for the UED in the EVI instance.

When NED 703 forwards a user packet to the public network side, interface 7031 may receive a unicast packet from the user side. Processor 7032 may search in the MAC table based on the unicast packet received from the user side. When a matching entry in the MAC table is found, processor 7032 may execute the eighth forwarding instruction 70334 stored in the memory 7033, which is to forward the unicast packet received from the user side within the EVI instance via interface 7031 based on the searching result. When no matching entry in the MAC table is found, processor 7032 may execute the ninth forwarding instruction 70335 stored in the memory 7033, which is to forward the unicast packet within a same VLAN of the local site via interface 7031. When processor 7032 receives a broadcast packet from the user side via interface 7031, processor 7032 may execute the tenth forwarding instruction 70336 stored in the memory 7033, which is to broadcast the broadcast packet received from the user side within a same VLAN of the local site via interface 7031 and forward the broadcast packet to UED 702 and the other EDs.

When NED 703 receives a packet of another ED in the public network side, interface 7031 may receive a unicast packet from another ED in the public network side. Processor 7032 may search in the MAC table. When a matching entry in the MAC table is found, processor 7032 may execute the eleventh forwarding instruction 70337 stored in the memory 7033, which is to forward the unicast packet within the local site. When the matching entry in the MAC table is for UED 702, processor 7032 may execute the twelfth forwarding instruction 70338 stored in the memory 7033, which is to forward the unicast packet to UED 702. When the matching entry in the MAC table found is still for another ED in the public network side, processor 7032 may discard the unicast packet. When no matching entry in the MAC table is found, processor 7032 may execute the third broadcast instruction 70339 stored in the memory 7033, which is to broadcast the unicast packet within a same VLAN of the local site. When a broadcast packet of another ED in the public network side is received via interface 7031, processor 7032 may execute the fourth broadcast instruction 70340 stored in the memory 7033, which is to broadcast the broadcast packet received from another ED in the public network side within a same VLAN of the local site via interface 7031.

In the example, NED 703 may learn local MAC addresses and remote MAC addresses of another site. A fully connected structure may be employed among NED 703 and other EDs (that is, other NEDs or EDs) in the public network side. NED 703 may also flood the learned local MAC addresses and remote MAC addresses advertised by UED 702 to other EDs or other NEDs. However, NED 703 may not advertise the learned local MAC addresses or remote MAC addresses to UED 702.

In practical applications, processor 7032 may learn the local MAC address based on a source MAC address of an Ethernet header in a Layer 2 user packet. That is, processor 7032 may receive a Layer 2 unicast or broadcast packet from the user side via interface 7031, determine an EVI instance based on the VLAN ID of the received Layer 2 unicast or broadcast packet and the port receiving the Layer 2 unicast or broadcast packet, record a corresponding relationship among the VLAN ID, the source MAC address, and the port in the MAC table of the EVI instance to learn the local MAC address. Processor 7032 may also learn a remote MAC address based on an IS-IS protocol packet. That is, processor 7032 may receive an IS-IS protocol packet from the public network side via interface 7031, determine an EVI instance based on an identifier of the EVI instance associated with the IS-IS protocol packet, and record a corresponding relationship among the VLAN ID and MAC address in the IS-IS protocol packet, and a public network interface receiving the IS-IS protocol packet in the MAC table of the EVI instance to learn a remote MAC address. Meanwhile, when advertising MAC addresses, processor 7032 may transmit an IS-IS protocol packet to another ED via interface 7031. The transmitted IS-IS protocol packet may include the learned local MAC addresses and the remote MAC addresses learned from an IS-IS protocol packet received from UED 702.

In practical applications, processors of UED and NED may be implemented based on CPU. Forwarding functions in the processors of UED and NED may be implemented based on a forwarding chip. The memories of UED and NED may be a Read-Only-Memory (ROM) or a Random Access Memory (RAM).

The invention claimed is:

1. A method of a first edge device in an Ethernet Virtualization Interconnection (EVI) network that implements a Layer 2 interconnection of multiple sites, the method comprising:

in response to receiving a unicast packet from a user side, searching in a first Media Access Control (MAC) table of an EVI instance of the EVI network to find a matching entry for the unicast packet;

in response to finding the matching entry in the first MAC table, forwarding the unicast packet within a local site of the EVI instance based on the matching entry;

in response to finding no matching entry in the first MAC table for the unicast packet, forwarding the unicast packet to a second edge device of the EVI instance;

in response to receiving a broadcast packet from the user side, broadcasting the broadcast packet within a Virtual Local Area Network (VLAN) of the local site, and forwarding the broadcast packet to the second edge device;

storing local MAC addresses of the local site in the first MAC table that does not store MAC addresses of a remote site interconnected to the local site by the EVI instance; and advertising the local MAC addresses to the second edge device that has a second MAC table storing MAC addresses of the local site and the remote site.

2. The method according to claim 1, further comprising:

in response to receiving a unicast packet of the second edge device from a public network side, searching, by the first edge device, in the first MAC table to find a matching entry for the unicast packet of the second edge device;

in response to finding the matching entry for the unicast packet of the second edge device in the first MAC table, forwarding, by the first edge device, the unicast packet of the second edge device within the local site, according to the matching entry for the unicast packet of the second edge device;

in response to finding no matching entry for the unicast packet of the second edge device in the first MAC table, broadcasting, by the first edge device, the unicast packet of the second edge device within the VLAN of the local site; and in response to receiving a broadcast packet of the second edge device from the public network side, broadcasting, by the first edge device, the broadcast packet of the second edge device within the VLAN of the local site.

3. The method according to claim 2, further comprising:
learning, by the first edge device, a local MAC address based on the unicast packet or the broadcast packet received from the user side, and recording the learned local MAC address in the first MAC table; and
transmitting, by the first edge device, an Intermediate System to Intermediate System (IS-IS) protocol packet to advertise the learned local MAC address to the second edge device.

4. The method according to claim 1, further comprising:
learning, by the first edge device, the local MAC addresses of the local site associated with the first edge device, without learning MAC addresses of the remote site.

5. The method according to claim 4, wherein the advertising comprises advertising, by the first edge device, the learned local MAC addresses to the second edge device.

6. The method according to claim 4, wherein devices of the local site access the EVI instance through the first edge device.

7. The method according to claim 1, further comprising:
determining, by the first edge device, the EVI instance based on a VLAN identifier of the unicast packet, the VLAN identifier identifying the VLAN.

8. The method according to claim 7, further comprising:
adding, by the first edge device, an entry into the first MAC table, the added entry specifying a relationship among the VLAN, a MAC address in the unicast packet, and a port of the first edge device.

9. A first edge device comprising:
an interface to an Ethernet Virtualization Interconnection (EVI) network that implements a Layer 2 interconnection of multiple sites; and
a processor to:
receive a unicast packet from a user side via the interface,
search, in a first Media Access Control (MAC) table of an EVI instance of the EVI network to find a matching entry for the unicast packet,
in response to finding the matching entry in the first MAC table, forward the unicast packet within a local site of the EVI instance via the interface based on the matching entry,
in response to finding no matching entry in the first MAC table for the unicast packet, forward the unicast packet to a second edge of the EVI instance via the interface,
receive a broadcast packet from the user side via the interface,
broadcast the broadcast packet within a Virtual Local Area Network (VLAN) of the local site via the interface,
forward the broadcast packet to the second edge device,
store local MAC addresses of the local site in the first MAC table that does not store MAC addresses of a remote site interconnected to the local site by the EVI instance, and
advertise the local MAC addresses to the second edge device that has a second MAC table storing MAC addresses of the local site and the remote site.

10. The first edge device according to claim 9, wherein the processor is further to:
receive a unicast packet of the second edge device from a public network side via the interface,
search in the first MAC table to find a matching entry matching the unicast packet of the second edge device,
in response to finding the matching entry for the unicast packet of the second edge device in the first MAC table, forward the unicast packet of the second edge device within the local site via the interface based on the matching entry for the unicast packet of the second edge device,
in response to finding no matching entry for the unicast packet of the second edge device in the first MAC table, broadcast the unicast packet of the second edge device within the VLAN of the local site via the interface,
receive a broadcast packet of the second edge device from the public network side via the interface, and
broadcast the broadcast packet of the second edge device within the VLAN of the local site via the interface.

11. The first edge device according to claim 9, wherein the processor is further to:
learn a local MAC address based on the unicast packet or broadcast packet received from the user side,
record the learned local MAC address in the first MAC table, and
transmit an Intermediate System-Intermediate System (IS-IS) protocol packet, which carries the learned local MAC address, to the second edge device via the interface.

12. The first edge device according to claim 9, wherein the processor is further to:
learn the local MAC addresses of the local site associated with the first edge device, without learning MAC addresses of the remote site.

13. The first edge device according to claim 12, wherein the processor is further to:
advertise the learned local MAC addresses to the second edge device using Intermediate System to Intermediate System (IS-IS) protocol packets.

14. The first edge device according to claim 9, wherein the processor is further to:
determine the EVI instance based on a VLAN identifier of the unicast packet, the VLAN identifier identifying the VLAN.

15. The first edge device according to claim 14, wherein the processor is further to:
add an entry into the first MAC table, the added entry specifying a relationship among the VLAN, a MAC address in the unicast packet, and a port of the first edge device.

16. A first edge device comprising:
an interface to an Ethernet Virtualization Interconnection (EVI) network that provides a Layer 2 interconnection of multiple sites including a local site associated with the first edge device, and a remote site interconnected by the EVI network to the local site; and
a processor to:
learn local Media Access Control (MAC) addresses of the local site, store the learned local MAC addresses in a first MAC table of the first edge device, the first MAC table not storing MAC addresses of the remote site, advertise the learned local MAC addresses to a second edge device that includes a second MAC table storing MAC addresses of the local site and the remote site, in response to a unicast packet from the local site, determine whether a matching entry for the unicast packet is in the first MAC table, in response to determining that the matching entry for the unicast packet is in the first MAC table, forward the unicast packet within the local site, and in response to determining that the matching entry for the unicast packet is not in the first MAC table, forward the unicast packet to the second edge device.

17. The first edge device of claim 16, wherein the processor is further to:

receive a broadcast packet from the local site, broadcast the broadcast packet within a Virtual Local Area Network (VLAN) of the local site, and forward the broadcast packet to the second edge device.

18. The first edge device according to claim 16, wherein the processor is further to:

for a first local MAC address of the learned local MAC addresses, add an entry into the first MAC table, the added entry specifying a relationship among a VLAN, the first local MAC address, and a port of the first edge device.

\* \* \* \* \*